US008265056B2

(12) United States Patent
Tsai et al.

(10) Patent No.: US 8,265,056 B2
(45) Date of Patent: Sep. 11, 2012

(54) PACKET DECODING FOR H-ARQ TRANSMISSION

(75) Inventors: Ming-Chang Tsai, San Diego, CA (US); Vinayak Chowdiah, San Diego, CA (US); Weihong Jing, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 997 days.

(21) Appl. No.: 12/033,875

(22) Filed: Feb. 19, 2008

(65) Prior Publication Data

US 2009/0207818 A1     Aug. 20, 2009

(51) Int. Cl.
*H04J 3/00* (2006.01)
(52) U.S. Cl. ........................................................ 370/345
(58) Field of Classification Search ........................ None
See application file for complete search history.

(56) References Cited

U.S. PATENT DOCUMENTS

| | | | | |
|---|---|---|---|---|
| 6,781,994 | B1 * | 8/2004 | Nogami et al. | 370/395.1 |
| 7,187,677 | B2 | 3/2007 | Torsner et al. | |
| 7,230,941 | B2 | 6/2007 | Odenwalder et al. | |
| 2002/0161892 | A1 * | 10/2002 | Partridge | 709/226 |
| 2003/0110435 | A1 | 6/2003 | Wu et al. | |
| 2004/0258139 | A1 * | 12/2004 | Namgoong et al. | 375/147 |
| 2007/0230403 | A1 * | 10/2007 | Douglas et al. | 370/334 |
| 2008/0065944 | A1 * | 3/2008 | Seol et al. | 714/748 |
| 2008/0159254 | A1 * | 7/2008 | Kwon et al. | 370/347 |

FOREIGN PATENT DOCUMENTS

| | | |
|---|---|---|
| GB | 2214759 A | 9/1989 |
| WO | WO 0232039 A2 | 4/2002 |
| WO | WO2004042953 | 5/2004 |

OTHER PUBLICATIONS

International Search Report and Written Opinion—PCT/US2009/034040, International Search Authority—European Patent Office—Jan. 26, 2010.

* cited by examiner

*Primary Examiner* — Gregory Sefcheck
*Assistant Examiner* — Amar Persaud
(74) *Attorney, Agent, or Firm* — Stanton Braden

(57) ABSTRACT

Techniques for efficiently decoding packets sent with H-ARQ are described. Packet decoding for H-ARQ may be performed based on local search around a start of packet (SOP) decision for a packet. The SOP decision for the packet may be made based on traffic detection results for received transmissions. At least one SOP hypothesis may be determined for the packet based on the SOP decision, and the received transmissions may be decoded based on the at least one SOP hypothesis. A sliding SOP window may be used to keep track of SOP hypotheses for the packet. The sliding window may be initialized at an earliest received transmission, moved forward for each subsequent received transmission with no detected packet data, and maintained at the first received transmission with detected traffic. Rotating buffers may be used to store received transmissions for packets for decoding.

35 Claims, 13 Drawing Sheets

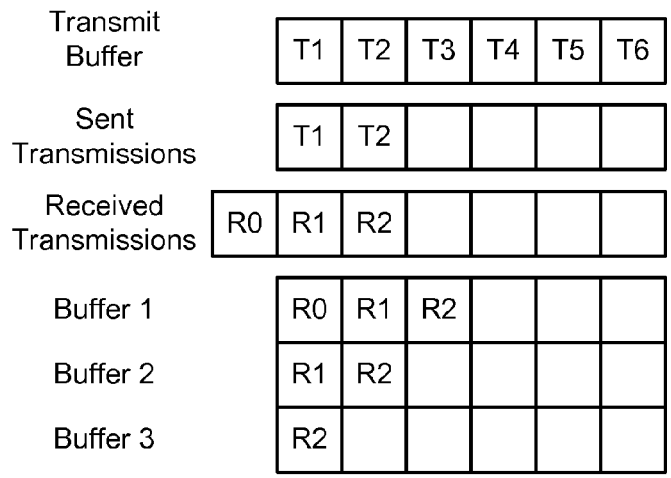
FIG. 7
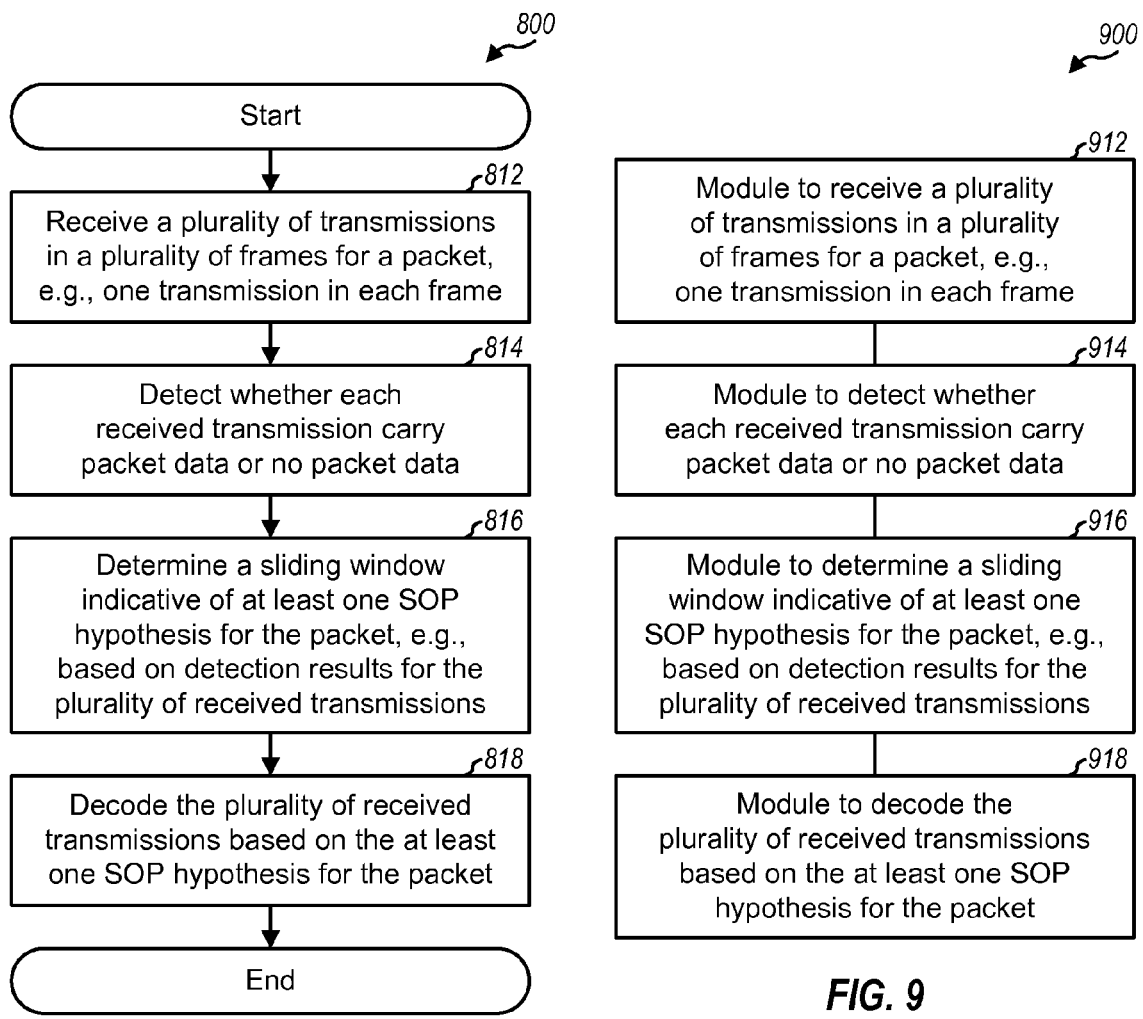
FIG. 8
FIG. 9

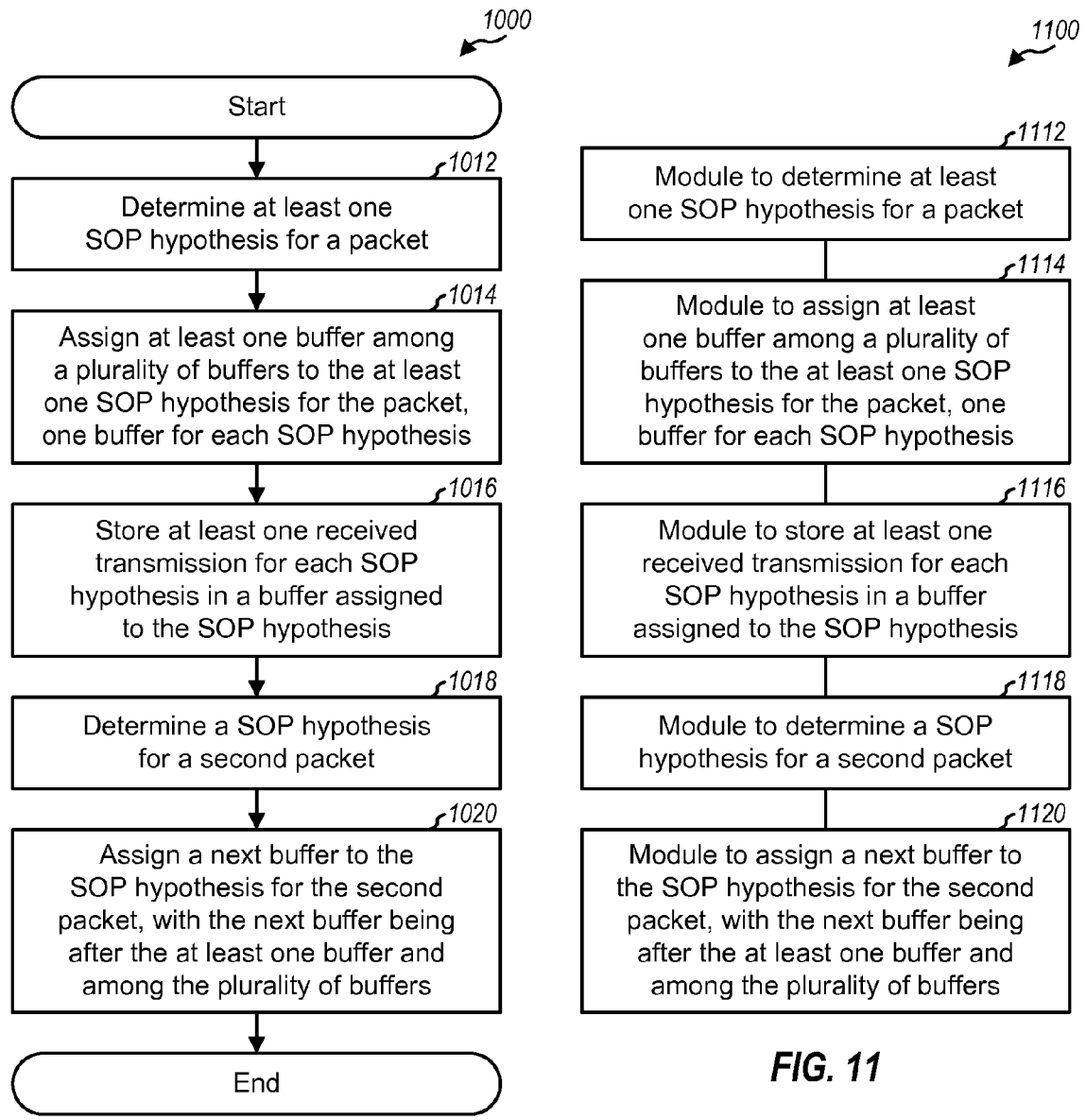

PACKET DECODING FOR H-ARQ TRANSMISSION

BACKGROUND

I. Field

The present disclosure relates generally to communication, and more specifically to techniques for decoding data in a wireless communication system.

II. Background

In a wireless communication system, a transmitter typically processes (e.g., encodes and symbol maps) a packet of data to generate data symbols, which are modulation symbols for data. The transmitter further processes the data symbols to generate a modulated signal and transmits this signal via a wireless channel. The wireless channel distorts the transmitted signal with a channel response and further degrades the signal with noise and interference. A receiver receives the transmitted signal and processes the received signal to obtain data symbol estimates, which are estimates of the transmitted data symbols. The receiver then processes (e.g., demodulates and decodes) the data symbol estimates to obtain a decoded packet.

The system may employ hybrid automatic repeat request (H-ARQ) transmission to improve reliability for data transmission. With H-ARQ, the transmitter may send one or more transmissions for a packet, one transmission at a time. The receiver may receive each transmission sent by the transmitter and may attempt to decode different combinations of received transmissions to recover the packet. The receiver may send an acknowledgement (ACK) when the packet is decoded correctly, and the transmitter may send a transmission for a new packet upon receiving the ACK.

Packet decoding for H-ARQ transmission may be challenging for several reasons. First, the transmitter may send transmissions for packets in a discontinuous manner so that the receiver may not know with certainty whether or not a transmission for a packet has been received in a given frame. Second, the transmissions sent by the transmitter may not include information to indicate the first transmission (or start) of each packet. The receiver may then attempt to decode the received transmissions for various hypotheses, with each hypothesis corresponding to a different guess as to when a given packet was first sent. Decoding for many hypotheses may increase decoder complexity and/or require more buffering.

There is therefore a need in the art for techniques to efficiently decode data for H-ARQ.

SUMMARY

Techniques for efficiently decoding packets sent with H-ARQ are described herein. These techniques may be able to handle multiple start of packet (SOP) hypotheses for a packet as well as delayed and time changing SOP hypotheses for the packet in an efficient manner.

In an aspect, packet decoding for H-ARQ is performed based on a local search around a SOP decision for a packet. A plurality of transmissions may be received in a plurality of frames for the packet, e.g., one transmission in each frame. Traffic detection may be performed to determine whether each received transmission carry packet data or no packet data. A SOP decision, which is a decision of a frame in which the packet might have started, may be made based on the traffic detection results for the plurality of received transmissions. At least one SOP hypothesis may be determined for the packet based on the SOP decision. Each SOP hypothesis may correspond to a different frame hypothesized to be the SOP of the packet. For example, one SOP hypothesis may cover a frame prior to the SOP decision, another SOP hypothesis may cover the frame for the SOP decision, and yet another SOP hypothesis may cover a frame after the SOP decision. The plurality of received transmissions may be decoded based on the at least one SOP hypothesis for the packet.

In another aspect, a sliding SOP window is used to keep track of SOP hypotheses for a packet. The sliding window may cover at least one SOP hypothesis for the packet and may be determined, e.g., based on traffic detection results for a plurality of transmissions received for the packet. For example, the sliding window may be initialized at an earliest received transmission, moved forward for each subsequent received transmission with no detected packet data, and maintained at the first received transmission with detected traffic. Transmissions received prior to the first received transmission with detected packet data may be stored. Decoding may be started when the first received transmission with packet data is detected. The plurality of received transmissions may be decoded based on the at least one SOP hypothesis for the packet. In each frame after decoding is started, all SOP hypotheses applicable for that frame may be determined, and decoding may be performed for one SOP hypothesis at a time.

In yet another aspect, rotating buffers are used to store received transmissions for packets for decoding. At least one SOP hypothesis may be determined for a packet. At least one buffer among a plurality of buffers may be assigned to the at least one SOP hypothesis for the packet, e.g., one buffer for each SOP hypothesis. The plurality of buffers may be selected for assignment to SOP hypotheses in a predetermined order, e.g., in a sequential and circular manner. Each buffer may store information, e.g., log-likelihood ratios (LLRs), for at least one received transmission for the SOP hypothesis to which the buffer is assigned.

Various aspects and features of the disclosure are described in further detail below.

BRIEF DESCRIPTION OF THE DRAWINGS

FIG. 7 shows storage of received transmissions in three buffers.

FIG. 8 shows a process for decoding packets sent with H-ARQ.

FIG. 9 shows an apparatus for decoding packets sent with H-ARQ.

FIG. 10 shows a process for decoding packets using rotating buffers.

FIG. 11 shows an apparatus for decoding packets using rotating buffers.

DETAILED DESCRIPTION

The techniques described herein may be used for various systems that employ H-ARQ transmission, which may also be referred to as incremental redundancy (IR) transmission. With H-ARQ, a transmitter sends one or more transmissions for a packet until the packet is decoded correctly by a receiver or the maximum number of transmissions has been sent. H-ARQ improves reliability for data transmission and supports rate adaptation for packets in the presence of changes in channel conditions.

Figure 1:
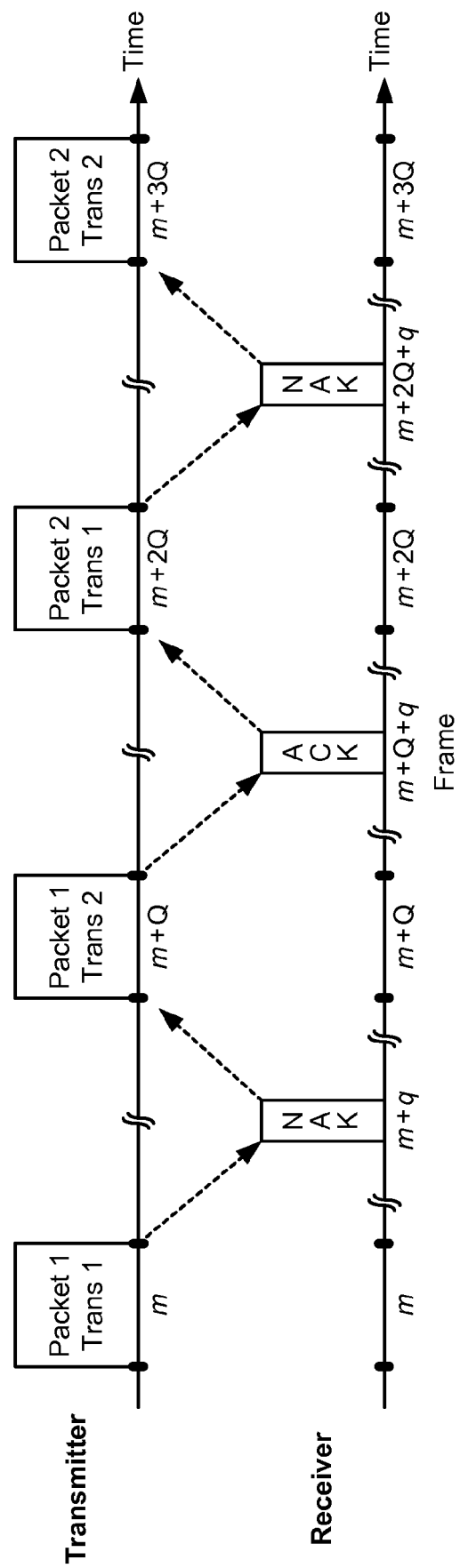
FIG. 1 illustrates H-ARQ transmission.

FIG. 1 illustrates H-ARQ transmission. A transmitter processes (e.g., encodes and symbol maps) a packet of data (Packet 1) and generates data symbols. The transmitter sends a first transmission (Trans 1) for Packet 1 in frame m. In general, a frame may cover any time duration and may be of different durations in different systems. A receiver receives and processes (e.g., demodulates and decodes) the first transmission, determines that Packet 1 is decoded in error, and sends a negative acknowledgement (NAK) to the transmitter in frame m+q. The transmitter receives the NAK and sends a second transmission (Trans 2) for Packet 1 in frame m+Q. Each transmission may contain different information for the packet. The receiver receives the second transmission, processes the first and second transmissions, determines that Packet 1 is decoded correctly, and sends an ACK in frame m+Q+q. The transmitter receives the ACK and terminates the transmission of Packet 1. The transmitter then processes the next packet (Packet 2) and sends transmissions for Packet 2 in similar manner.

In FIG. 1, transmissions for packets are sent every Q frames. To improve channel utilization, the transmitter may send up to Q packets in an interlaced manner. A first interlace may be defined for frames m, m+Q, etc., a second interlace may be defined for frames m+1, m+Q+1, etc., and a Q-th interlace may be defined for frames m+Q−1, m+2Q−1, etc. The Q interlaces may be offset from one another by one frame. The transmitter may send up to Q packets on the Q interlaces. For example, if Q=2, then the first interlace may include odd-numbered frames, and the second interlace may include even-numbered frames. In general, the H-ARQ retransmission delay Q and the ACK/NAK delay q may be selected to provide sufficient processing time for both the transmitter and receiver.

For clarity, FIG. 1 shows transmission of both NAKs and ACKs. For an ACK-based scheme, an ACK is sent if a packet is decoded correctly, and NAKs are not sent and are presumed by the absence of ACKs.

H-ARQ makes efficient use of a communication channel by having the transmitter and receiver work together to occupy the channel just long enough for each packet to be decoded correctly. The transmitter sends one transmission at a time for a packet until the packet is decoded correctly and an ACK is received. The receiver processes all transmissions received for the packet, with each transmission providing additional information for the packet. This ability to process all transmissions received for the packet assumes that the receiver can ascertain the start of packet (SOP).

The system may support discontinuous traffic transmission (DTTX), e.g., for sticky assignment of radio resources. With sticky assignment, signaling may not be sent explicitly to indicate whether previously assigned radio resources are still assigned or being used. For DTTX, the transmitter may or may not send a traffic transmission, which is a transmission for a packet, in a given frame. The transmitter may send nothing and/or signaling in a DTTX frame, which is a frame with no traffic transmission. For example, signaling may be sent in a DTTX frame to maintain a traffic channel for the receiver with a sticky assignment.

Figure 2:
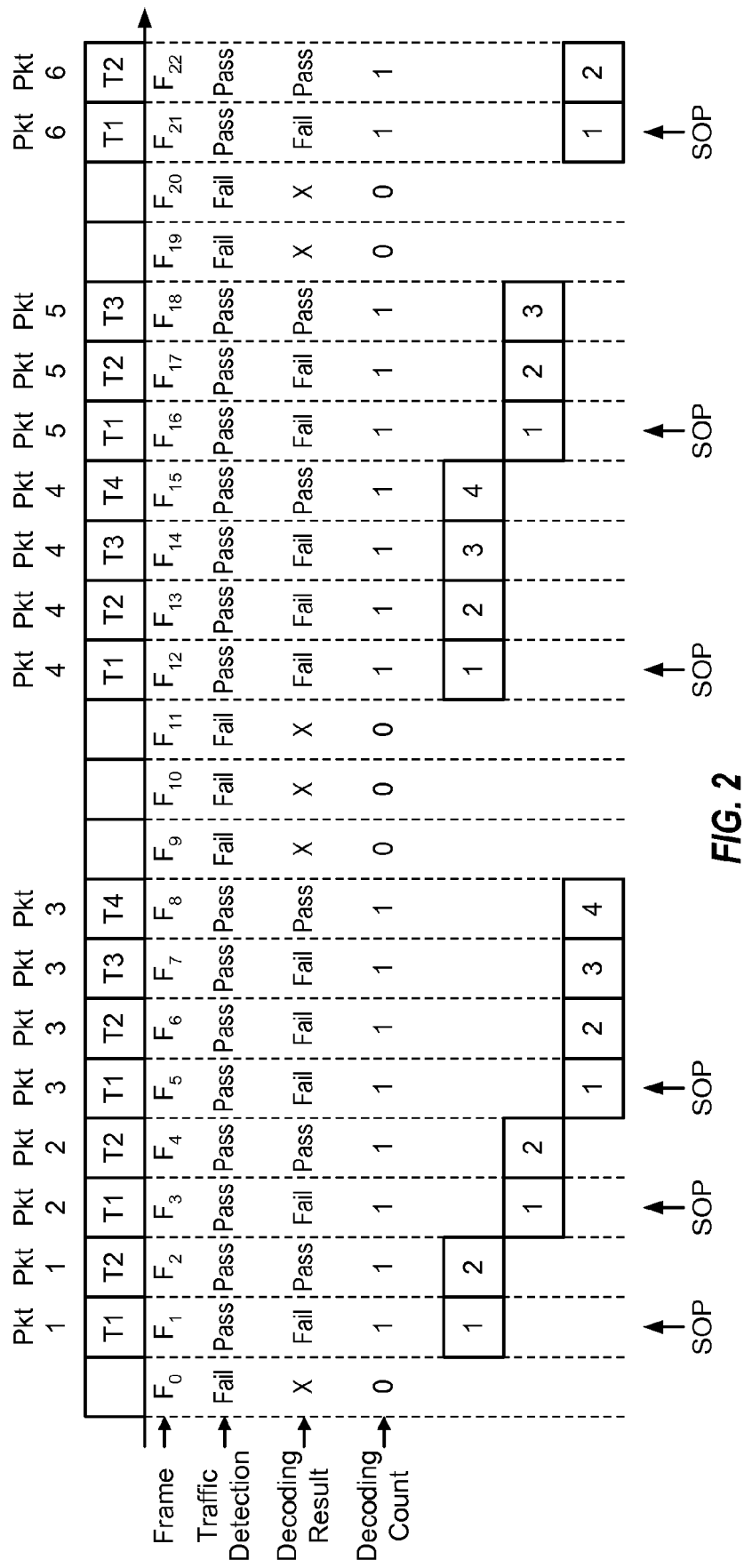
FIG. 2 shows packet decoding for H-ARQ without SOP search.

FIG. 2 shows an example of packet decoding for H-ARQ without SOP search. In this example, no information is sent with a traffic transmission to indicate which transmission is being sent among all possible transmissions for a packet. The receiver may perform traffic detection in each frame to determine whether or not a traffic transmission has been received in that frame. Traffic detection may also be referred to as erasure detection, packet data detection, DTX detection, etc. The traffic detection may provide a "fail" indication if no traffic transmission is detected or a "pass" indication if traffic transmission is detected. However, the fail/pass indications may be erroneous. A missed detection occurs when a traffic transmission was sent but the traffic detection provides a "fail" indication. A false alarm occurs when a traffic transmission was not sent but the traffic detection provides a "pass" indication.

In FIG. 2, the traffic detection is assumed to be accurate in each frame. The receiver receives the first transmission (T1) for packet 1 (Pkt 1) in frame $F_1$ and decodes packet 1 in error based solely on this transmission. The receiver receives the second transmission (T2) for packet 1 in frame $F_2$ and decodes packet 1 correctly based on the first and second transmissions. The receiver receives the first transmission for packet 2 (Pkt 2) in frame $F_3$ and decodes packet 2 in error based solely on the first transmission. The receiver receives the second transmission for packet 2 in frame $F_4$ and decodes packet 2 correctly based on the first and second transmissions. The receiver receives a transmission for packet 3 (Pkt 3) in each of frames $F_5$ through $F_8$, decodes packet 3 in error in each of frames $F_5$ through $F_7$, and decodes packet 3 correctly in frame $F_8$ based on the four transmissions received for packet 3.

No transmissions are sent in frames $F_9$, $F_{10}$ and $F_{11}$, the traffic detection provides "fail" indications, and the receiver does not attempt decoding in any of these frames. The receiver receives a transmission for packet 4 (Pkt 4) in each of frames $F_{12}$ through $F_{15}$, decodes packet 4 in error in each of frames $F_{12}$ through $F_{14}$, and decodes packet 4 correctly in frame $F_{15}$ based on the four transmissions received for packet 4. The receiver receives a transmission for packet 5 (Pkt 5) in each of frames $F_{16}$ through $F_{18}$, decodes packet 5 in error in each of frames $F_{16}$ and $F_{17}$, and decodes packet 5 correctly in frame $F_{18}$ based on the three transmissions received for packet 5. No transmissions are sent in frames $F_{19}$ and $F_{20}$, the traffic detection provides "fail" indications, and the receiver does not attempt decoding in any of these frames. The receiver receives a transmission for packet 6 (Pkt 6) in each of frames $F_{21}$ and $F_{22}$, decodes packet 6 in error in frame $F_{21}$, and decodes packet 6 correctly in frame $F_{22}$ based on the two transmissions received for packet 6.

FIG. 2 shows an ideal scenario in which the receiver is able to correctly determine the SOP of each packet based on totally reliable traffic detection. In this scenario, the receiver is able to make a correct SOP decision for each packet. In the example shown in FIG. 2, the SOP decision for packet 1 is frame $F_1$, the SOP decision for packet 2 is frame $F_3$, the SOP decision for packet 3 is frame $F_5$, etc. With correct SOP decisions, the receiver is able to process each packet as soon as possible and with minimum decoding complexity based on the SOP decision for that packet. In each frame, the receiver may attempt to decode the current packet based on all transmissions received for that packet. In FIG. 2, the receiver performs a total of 17 decoding attempts in 23 frames and performs at most one decoding attempt per frame.

The traffic detection may not be totally reliable, and some errors in traffic detection may be made. Consequently, the SOP decisions for packets may be incorrect. For example, a false alarm may result from erroneous detection of a traffic transmission when none was sent, which may then result in a SOP decision for a packet being at a wrong frame. The incorrect SOP decision may then result in decoding failure in each subsequent frame. Potential SOP decision errors may be addressed in various manners, as described below.

Figure 3:
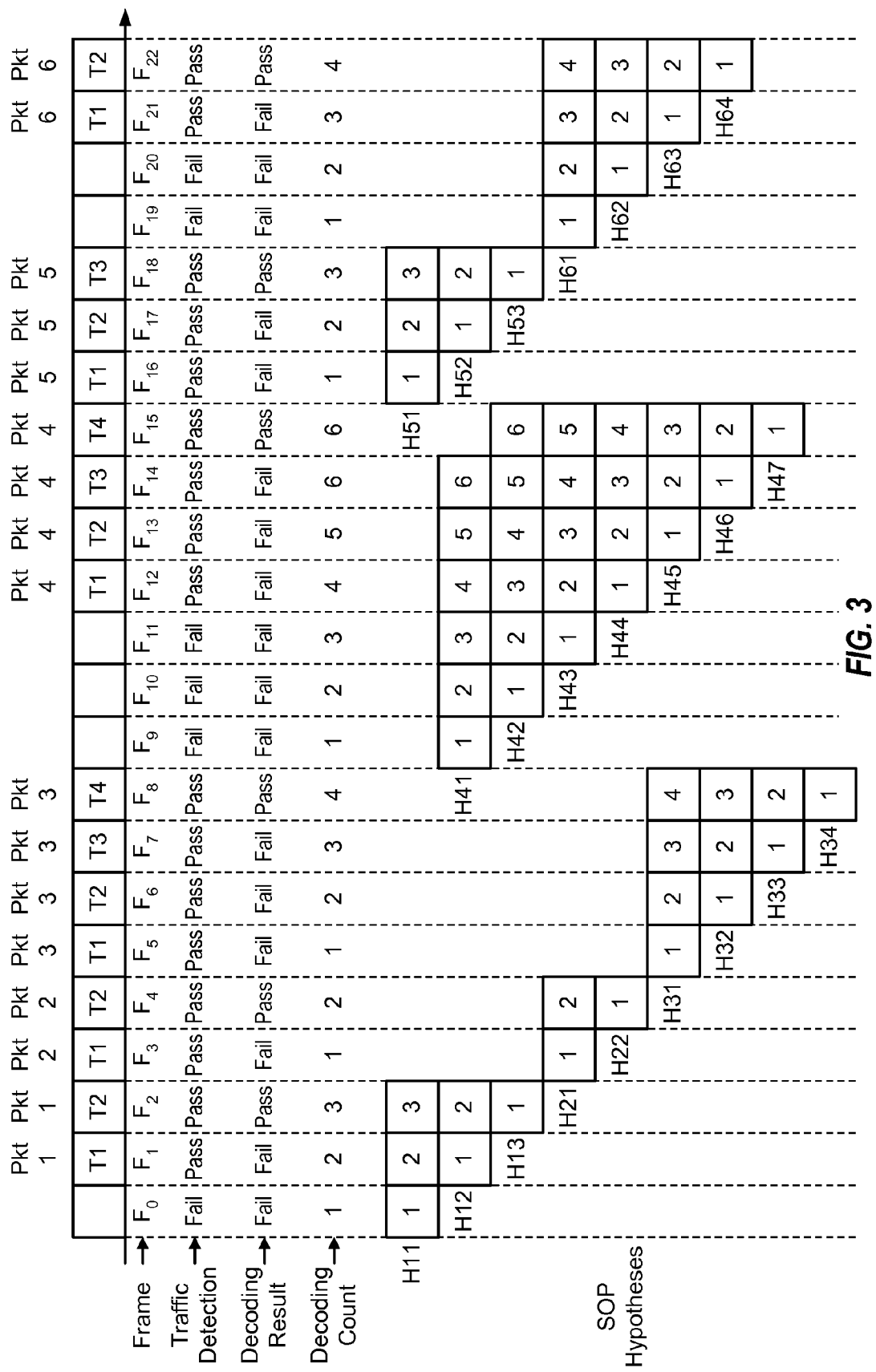
FIG. 3 shows packet decoding for H-ARQ with global SOP search.

FIG. 3 shows an example of packet decoding for H-ARQ with global SOP search. With global SOP search, each frame is treated as a potential SOP regardless of the traffic detection for that frame. A given packet may thus be decoded based on one or more SOP hypotheses. Each SOP hypothesis corresponds to a different frame hypothesized to be the SOP of the packet. For each SOP hypothesis, decoding may be attempted in each frame, starting with the hypothesized SOP frame, until the packet is decoded correctly. The sequence of transmissions in FIG. 3 is the same as in FIG. 2.

In frame $F_0$, decoding may be attempted for one SOP hypothesis for packet 1, which is a first SOP hypothesis H11 corresponding to the SOP of packet 1 being at frame $F_0$. The decoding of the transmission received in frame $F_0$ for the first SOP hypothesis fails. In frame $F_1$, decoding may be attempted for two SOP hypotheses for packet 1, which includes the first SOP hypothesis as well as a second SOP hypothesis H12 corresponding to the SOP of packet 1 being at frame $F_1$. The decoding of the transmissions received in frames $F_0$ and $F_1$ for the first SOP hypothesis fails, and the decoding of the transmission received in frame $F_1$ for the second SOP hypothesis also fails. In frame $F_2$, decoding may be attempted for three SOP hypotheses for packet 1, which includes the first and second SOP hypotheses as well as a third SOP hypothesis H13 corresponding to the SOP of packet 1 being at frame $F_2$. The decoding of the transmissions received in frames $F_0$, $F_1$ and $F_2$ for the first SOP hypothesis fails, the decoding of the transmissions received in frames $F_1$ and $F_2$ for the second SOP hypothesis succeeds, and the decoding of the transmission received in frame $F_2$ for the third SOP hypothesis also fails.

In frame $F_3$, one decoding attempt may be made for a first SOP hypothesis H21 for packet 2, which corresponds to the SOP of packet 2 being at frame $F_3$. In frame $F_4$, two decoding attempts may be made, one for the first SOP hypothesis (which succeeds) and another for a second SOP hypothesis H22 corresponding to the SOP of packet 2 being at frame $F_4$ (which fails).

For packet 3, one decoding attempt may be made in frame $F_5$ for a first SOP hypothesis H31 corresponding to the SOP of packet 3 being at frame $F_5$. Two decoding attempts may be made in frame $F_6$ for the first SOP hypothesis as well as a second SOP hypothesis H32 corresponding for the SOP of packet 3 being at frame $F_6$. Three decoding attempts may be made in frame $F_7$ for the first and second SOP hypotheses as well as a third SOP hypothesis H33 corresponding to the SOP of packet 3 being at frame $F_7$. Four decoding attempts may be made in frame $F_8$ for the first, second and third SOP hypotheses as well as a fourth SOP hypothesis H34 corresponding to the SOP of packet 3 being at frame $F_8$.

The decoding for each subsequent packet may proceed in similar manner. For packet 4, decoding attempts may be made for seven SOP hypotheses H41 through H47 corresponding to the SOP of packet 4 being at frames $F_9$ through $F_{15}$, respectively. The number of decoding attempts in each frame is given in FIG. 3. In this example, up to six transmissions may be sent for a given packet. Thus, in frame $F_{15}$, decoding is not attempted for the first SOP hypothesis H41, which would have terminated in frame $F_{14}$.

In the example shown in FIG. 3, up to 62 decoding attempts may be made over 23 frames, and up to six decoding attempts may be made per frame. The number of decoding attempts may increase significantly when there are many SOP hypotheses, e.g., due to no traffic transmissions in frames $F_9$, $F_{10}$ and $F_{11}$ prior to the first transmission for packet 4 in frame $F_{12}$. Global SOP search may ensure that all packets can be decoded, albeit at the expense of higher decoding complexity. In general, it is desirable to reduce the number of SOP hypotheses while achieving reliable H-ARQ packet decoding.

In an aspect, packet decoding for H-ARQ is performed based on local search around a SOP decision for a packet. If the SOP decision is close to the true SOP of the packet, then the number of decoding attempts may be reduced by performing local search around the SOP decision.

Figure 4:
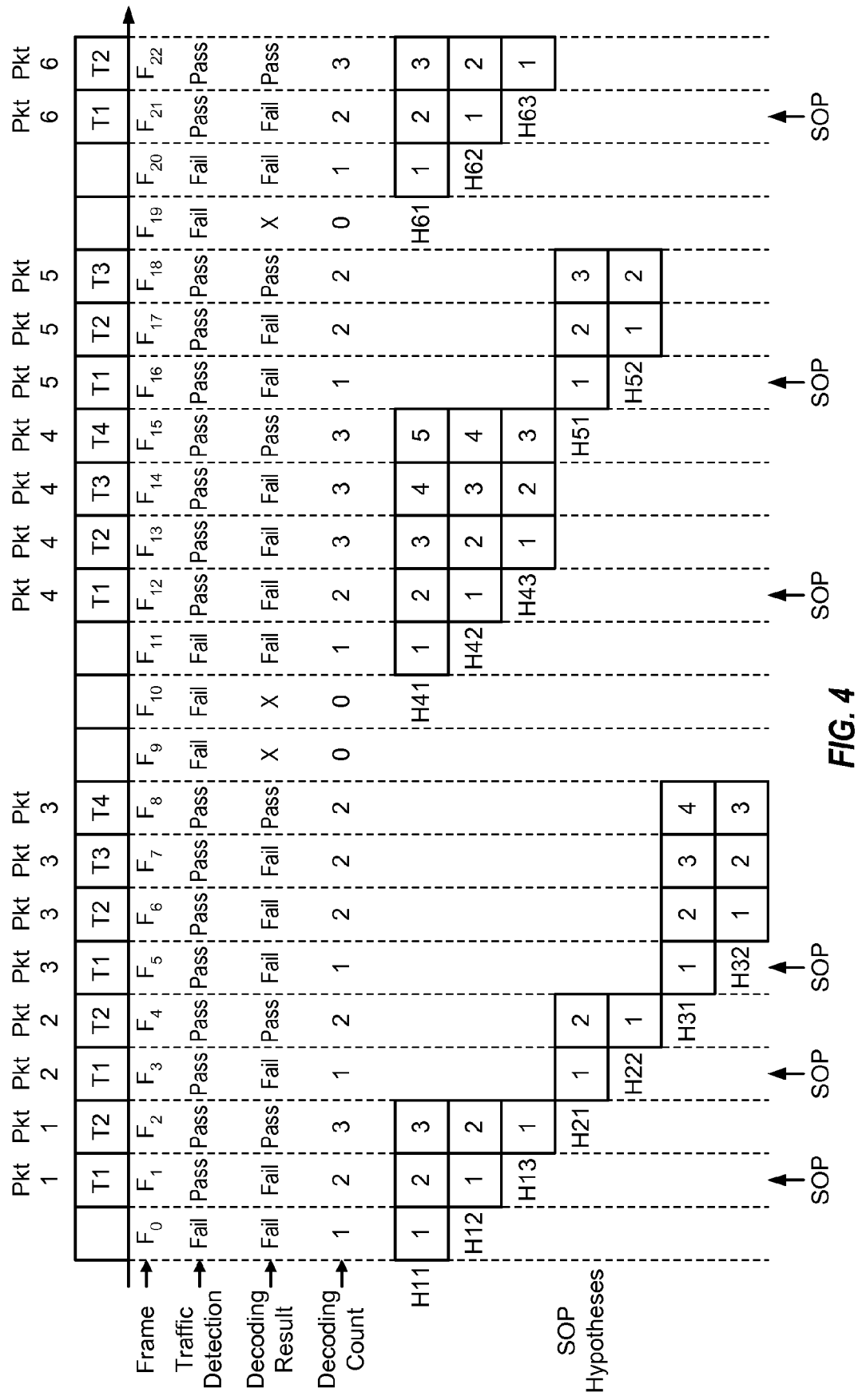
FIG. 4 shows packet decoding for H-ARQ with local SOP search.

FIG. 4 shows an example of packet decoding for H-ARQ with local SOP search. In the example shown in FIG. 4, the true SOP is assumed to be at most one frame away from the SOP decision. For each packet, a SOP window covering up to three SOP hypotheses may be centered on the SOP decision, and decoding attempts may be made for all SOP hypotheses within the SOP window. The sequence of transmissions in FIG. 4 is the same as in FIG. 2.

The SOP decision for packet 1 is frame $F_1$, which is the first frame in which the traffic detection provides a "pass" indication. Decoding attempts may be made for packet 1 for three SOP hypotheses of $F_0$, $F_1$ and $F_2$, which are within one frame of the SOP decision. The SOP decision for packet 2 is frame $F_3$. Decoding attempts may be made for packet 2 for two SOP hypotheses of $F_3$ and $F_4$ (and not $F_2$, which is known to carry packet 1). The SOP decision for packet 3 is frame $F_5$. Decoding attempts may be made for packet 3 for two SOP hypotheses of $F_5$ and $F_6$ (and not $F_4$, which is known to carry packet 2). Frames $F_7$ and $F_8$ are outside of the SOP window for packet 3, and no decoding attempts are made for SOP hypotheses with these frames. The SOP decision for packet 4 is frame $F_{12}$, which is the first frame in which the traffic detection provides a "pass" indication after three frames of no traffic transmissions. Decoding attempts may be made for packet 4 for three SOP hypotheses of $F_{11}$, $F_{12}$ and $F_{13}$, and no decoding attempts are made for SOP hypotheses of $F_{14}$ and $F_{15}$, which are outside of the SOP window for packet 4. The decoding for each subsequent packet may proceed in similar manner.

In the example shown in FIG. 4, up to 39 decoding attempts may be made over 23 frames, and up to three decoding attempts may be made per frame for up to three SOP hypotheses within a 3-frame SOP window. The number of decoding attempts in each frame is indicated by the "decoding count" entry for that frame. The total number of decoding attempts may be obtained by accumulating the decoding count values over 23 frames. SOP windows of other sizes (e.g., two, four, five, or more frames) may also be used, possibly at the expense of higher decoding complexity. The SOP window may also be centered at another frame instead of the SOP decision.

The local SOP search relies on the true SOP being close to the SOP decision and also within the SOP window. Packet decoding performance may degrade when the SOP decision is not sufficiently close to the true SOP, which may result from missed detection or false alarm. A history of traffic detection indications may be stored and used to detect for possible false alarms. For example, a single-frame transmission may be identified whenever the traffic detection provides "fail", "pass", and "fail" indications (or "pass", "fail", and "fail" indications) for three consecutive frames. This single-frame transmission may be declared as a false alarm if it is decoded in error. In one design, all SOP hypotheses associated with the false alarm are eliminated, and no decoding attempts are made for these SOP hypotheses. In another design, the SOP hypotheses for the false alarm are decoded last in each frame.

In another aspect, a sliding SOP window is used to keep track of SOP hypotheses for a packet. The sliding SOP window may be moved forward in each frame until the traffic detection provides a "pass" indication and a SOP decision is made for the packet. Transmissions received in frames covered by the sliding SOP window may be prepared for decoding as the window is moved forward. However, decoding may be delayed until the SOP decision is made. The use of the sliding SOP window may reduce decoding complexity while providing reliable packet decoding for H-ARQ.

Figure 5A:
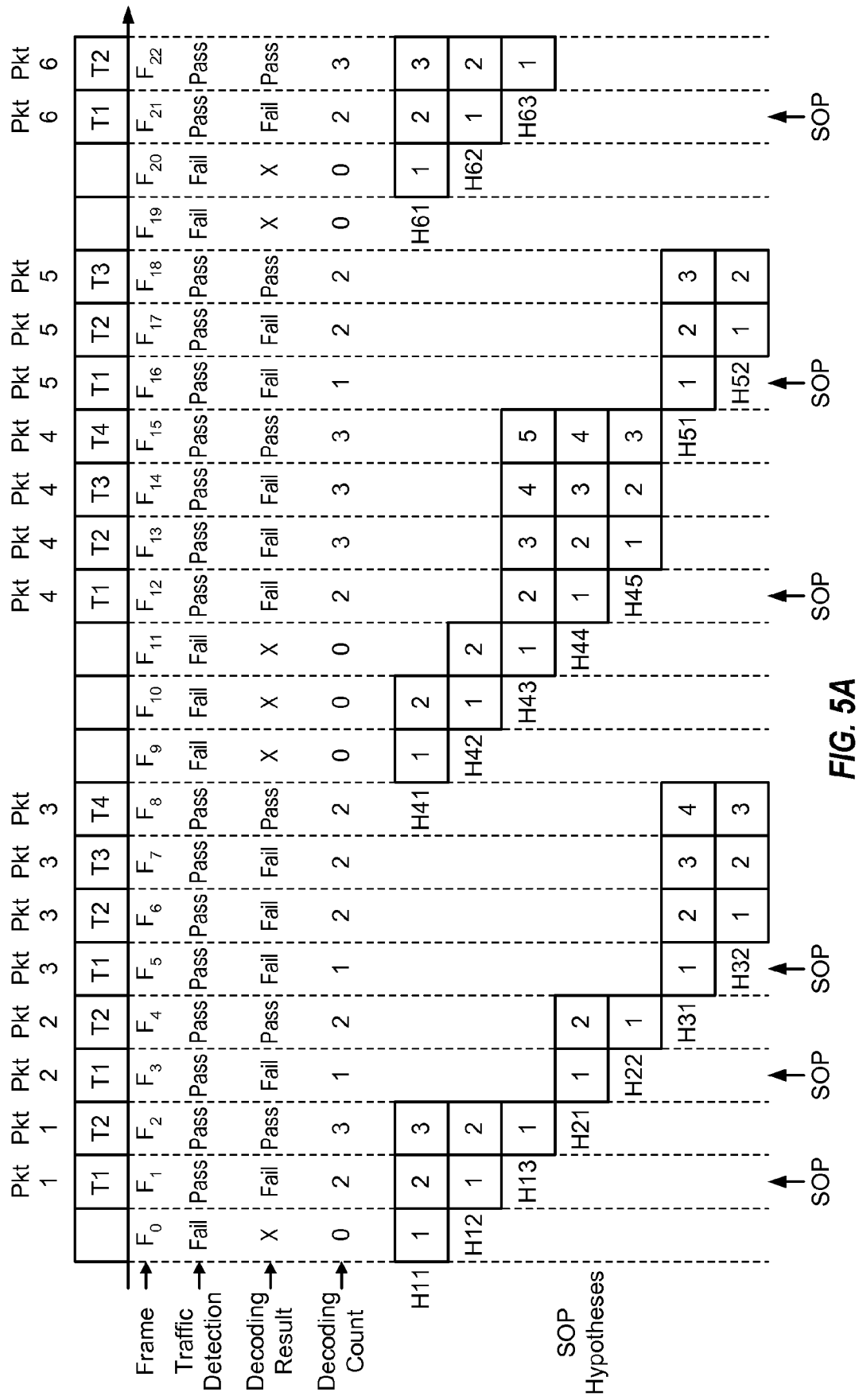
FIGS. 5A and 5B show packet decoding for H-ARQ with 3-frame and 5-frame sliding SOP windows, respectively.

FIG. 5A shows an example of packet decoding for H-ARQ with a 3-frame sliding SOP window. The sequence of transmissions in FIG. 5A is the same as in FIG. 2. Initially, a Reset command is received to reset the sliding SOP window for packet 1. In one design, the sliding SOP window for a given packet is centered at the SOP decision for that packet and may include one frame to the left of the SOP decision if it is not a frame for another correctly decoded packet and may also include one frame to the right of the SOP decision if a traffic transmission is received in this frame.

For packet 1, the traffic detection provides a "fail" indication in frame $F_0$, and the SOP window for packet 1 is initially centered at this frame. The transmission received in frame $F_0$ may be stored for the first SOP hypothesis H11 for packet 1 instead of decoded. A received transmission may also be processed prior to storage in a buffer. The processing may include computing LLRs for code bits in the received transmission, combining the LLRs for the current frame with LLRs for prior frames (if any) for the current packet, etc. In frame $F_1$, the traffic detection provides a "pass" indication, the SOP decision for packet 1 is frame $F_1$, and the sliding SOP window moves over by one frame and remains. The transmissions received in frames $F_0$ and $F_1$ may be combined and decoded (in error) for the first SOP hypothesis. The transmission received in frame $F_1$ may also be decoded (in error) for the second SOP hypothesis H12 for packet 1. In frame $F_2$, the right side of the SOP window expands by one frame and remains. The transmissions received in frames $F_0$, $F_1$ and $F_2$ may be combined and decoded (in error) for the first SOP hypothesis. The transmissions received in frames $F_1$ and $F_2$ may also be combined and decoded (correctly) for the second SOP hypothesis. The transmission received in frame $F_2$ may be decoded (in error) for the third SOP hypothesis H13 for packet 1. The SOP window covers three SOP hypotheses for packet 1.

For packet 2, the traffic detection provides a "pass" indication in frame $F_3$, the SOP decision for packet 2 is frame $F_3$, and the SOP window for packet 2 is centered at frame $F_3$. The left side of the SOP window is not expanded since frame $F_2$ is known to carry packet 1. The transmission received in frame $F_3$ may be decoded (in error) for the first SOP hypothesis H21 for packet 2. In frame $F_4$, the right side of the SOP window is expanded by one frame. The transmissions received in frames $F_3$ and $F_4$ may be combined and decoded (correctly) for the first SOP hypothesis, and the transmission received in frame $F_4$ may be decoded (in error) for the second SOP hypothesis H22 for packet 2. The SOP window covers two SOP hypotheses for packet 2.

For packet 3, the traffic detection provides a "pass" indication in frame $F_5$, the SOP decision for packet 3 is frame $F_5$, and the SOP window for packet 3 is centered at frame $F_5$. The transmission received in frame $F_5$ may be decoded (in error) for the first SOP hypothesis H31 for packet 3. In frame $F_6$, the right side of the SOP window is expanded by one frame to cover the second SOP hypothesis H32 for packet 3. Decoding may be attempted for the two SOP hypotheses for packet 3 in each of frames $F_6$, $F_7$ and $F_8$.

For packet 4, the traffic detection provides a "fail" indication in each of frames $F_9$, $F_{10}$ and $F_{11}$ and a "pass" indication in frame $F_{12}$. The SOP decision for packet 4 is frame $F_{12}$. The sliding SOP window for packet 4 moves over by one frame in each of frames $F_{10}$, $F_{11}$ and $F_{12}$, remains at frame $F_{12}$, and is expanded on the right side by one frame in frame $F_{13}$. The transmissions received in frame $F_9$, $F_{10}$, $F_{11}$, $F_{12}$ and $F_{13}$ may be stored for up to three SOP hypotheses in each frame. In particular, the SOP window covers SOP hypothesis H41 for packet 4 in frame $F_9$, SOP hypotheses H41 and H42 in frame $F_{10}$, SOP hypotheses H42 and H43 in frame $F_{11}$, SOP hypotheses H43 and H44 in frame $F_{12}$, and SOP hypotheses H43, H44 and H45 in frame $F_{13}$. Decoding may be attempted for two SOP hypotheses H43 and H44 in frames $F_{12}$, and for three SOP hypotheses H43, H44 and H45 in each of frames $F_{13}$, $F_{14}$ and $F_{15}$. The decoding for packets 5 and 6 may proceed in similar manner.

In the example shown in FIG. 5A, up to 36 decoding attempts may be made over 23 frames, and up to three decoding attempts may be made per frame in the worst case. The total number of decoding attempts may be obtained by accumulating the decoding count values over 23 frames. The number of decoding attempts for the sliding SOP window may be fewer than the number of decoding attempts for the local SOP search.

Figure 5B:
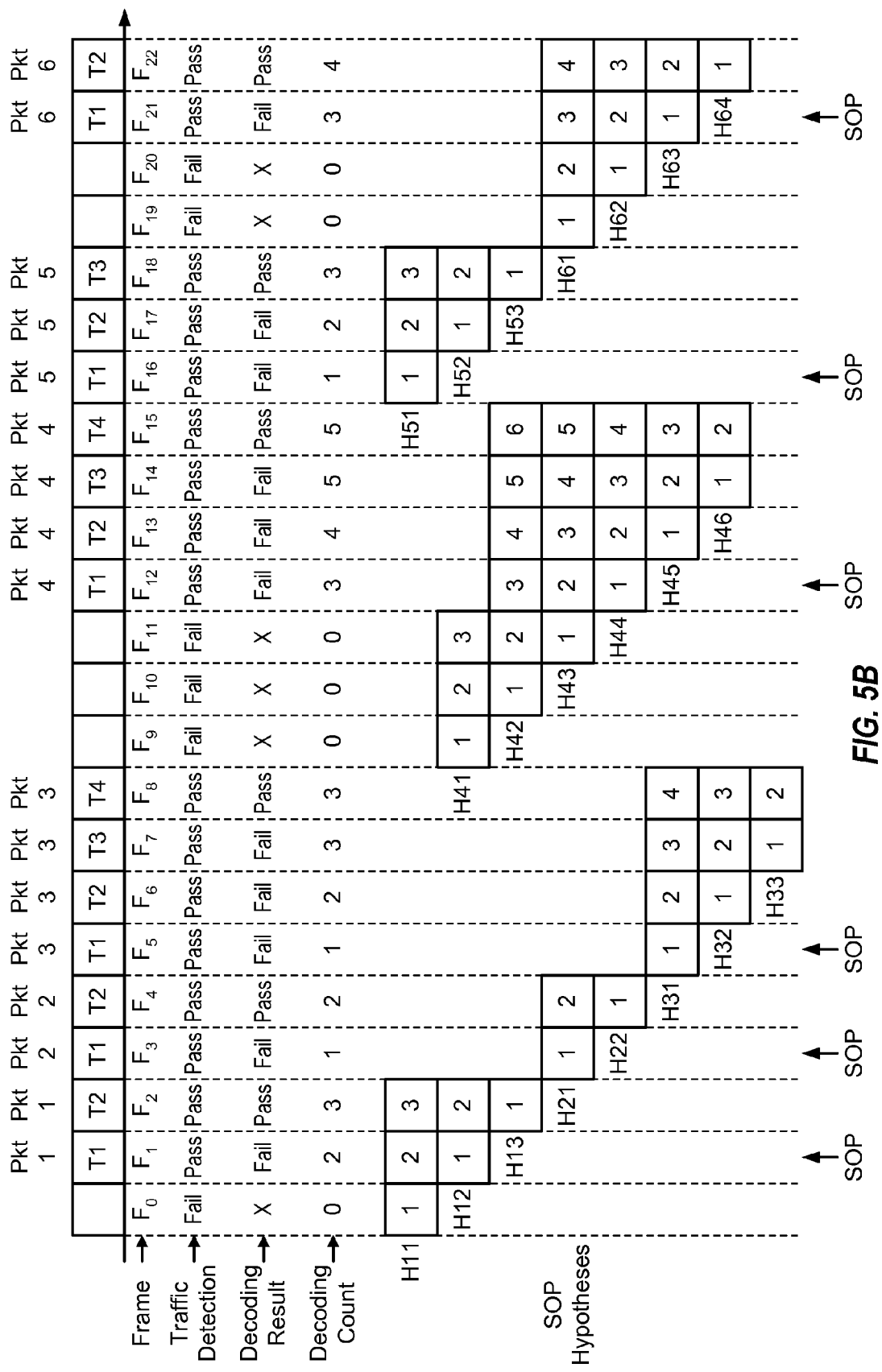

FIG. 5B shows an example of packet decoding for H-ARQ with a 5-frame sliding SOP window. The sequence of transmissions in FIG. 5B is the same as in FIG. 2. In this design, the sliding SOP window for each packet is centered at the SOP decision for that packet and may include up to two frames to the left and/or up to two frames to the right of the SOP decision.

For packet 1, the traffic detection provides a "pass" indication in frame $F_1$, the SOP decision is frame $F_1$, and the SOP window is centered at frame $F_1$ and includes three SOP hypotheses for $F_0$, $F_1$ and $F_2$. For packet 2, the SOP decision is frame $F_3$, and the SOP window is centered at frame $F_3$ and includes two SOP hypotheses for $F_3$ and $F_4$. For packet 3, the SOP decision is frame $F_5$, and the SOP window is centered at frame $F_5$ and includes three SOP hypotheses for $F_5$, $F_6$ and $F_7$. For packet 4, the SOP window is initially centered at frame $F_9$, then moves over by one frame in each of frames $F_{10}$, $F_{11}$ and $F_{12}$, remains at frame $F_{12}$ where the SOP decision is made, and is expanded on the right side to cover frames $F_{13}$ and $F_{14}$. The SOP window for packets 5 and 6 may be determined in similar manner. In the example shown in FIG. 5B, up to 47 decoding attempts may be made over 23 frames, and up to five decoding attempts may be made per frame in the worst case.

In the examples shown in FIGS. 5A and 5B, after successfully decoding packet 3, the received transmissions may be processed (but not necessarily decoded) in anticipation of a SOP decision for packet 4. The received transmissions may be stored for up to K SOP hypotheses as new transmissions continue to arrive. K may be defined as $K = \lceil N/2 \rceil$, where N is the width of the sliding SOP window and "⌈ ⌉" is a ceiling operator. In FIG. 5A, N=3, K=2, the 3-frame sliding SOP window is centered at the SOP decision, and the received transmissions may be stored for up to two SOP hypotheses within the SOP window before a SOP decision is made. In FIG. 5B, N=5, K=3, the 5-frame sliding SOP window is centered at the SOP decision, and the received transmissions may be stored for up to three SOP hypotheses within the SOP window before a SOP decision is made. Regardless of the sliding SOP window size, earlier SOP hypotheses that fall outside of the sliding SOP window before any SOP decision is made (e.g., SOP hypotheses H41 and H42 for packet 4 in FIG. 5A) may be dropped without attempting decoding on these SOP hypotheses. When the SOP decision is made, the SOP window stops sliding, and decoding may be attempted for all SOP hypotheses within the SOP window until successful decoding is declared or the maximum number of transmissions has elapsed.

In yet another aspect, rotating buffers are used to store information for packets for decoding. N buffers may be used to store information for up to N SOP hypotheses for a given packet, one buffer per SOP hypothesis, where N may be determined by the SOP window and/or other factors. Whenever a new SOP hypothesis is formed, one of the N buffers may be assigned to store information for this SOP hypothesis. The N buffers may be selected in a predetermined order and assigned to new SOP hypotheses.

Figure 6A:
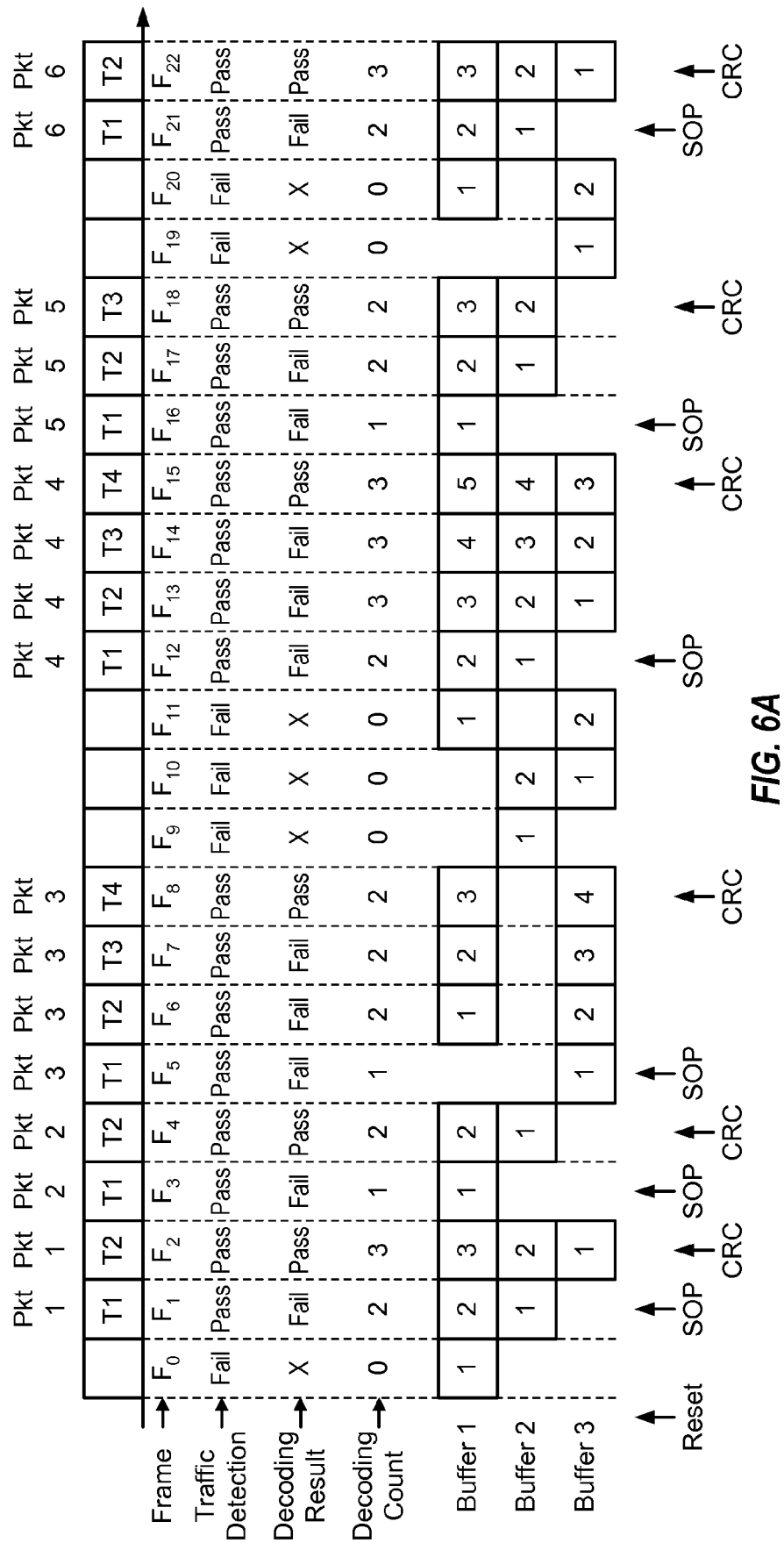
FIGS. 6A and 6B show packet decoding for H-ARQ with three and five rotating buffers, respectively, for 3-frame and 5-frame sliding SOP windows.

FIG. 6A shows an example of packet decoding for H-ARQ with three rotating buffers for a 3-frame sliding SOP window. In this example, buffers 1, 2 and 3 are assigned in a sequential and circular manner to new SOP hypotheses. The sequence of transmissions in FIG. 6A is the same as in FIG. 2.

For packet 1, the first SOP hypothesis H11 is declared in frame $F_0$ and assigned to buffer 1, the second SOP hypothesis H12 is declared in frame $F_1$ and assigned to buffer 2, and the third SOP hypothesis H13 is declared in frame $F_2$ and assigned to buffer 3. Each buffer stores information for all received transmissions for its assigned SOP hypothesis, as described below. For packet 2, the first SOP hypothesis H21 is declared in frame $F_3$ and assigned to buffer 1 (which is the oldest previously assigned buffer at frame $F_3$), and the second SOP hypothesis H22 is declared in frame $F_4$ and assigned to buffer 2. For packet 3, the first SOP hypothesis H31 is assigned to buffer 3 (which is the oldest previously assigned buffer at frame $F_5$), and the second SOP hypothesis H32 is assigned to buffer 1. For packet 4, the first SOP hypothesis H41 is assigned to buffer 2 (which is the oldest previously assigned buffer at frame $F_9$), the second SOP hypothesis H42 is assigned to buffer 3, the third SOP hypothesis H43 is assigned to buffer 1, the fourth SOP hypothesis H44 is assigned to buffer 2, and the fifth SOP hypothesis H45 is assigned to buffer 3. Buffers may be assigned to the SOP hypotheses for packets 5 and 6 in similar manner.

FIG. 7 shows an example of how buffers 1, 2 and 3 may store information for the first, second, and third SOP hypotheses, respectively, for packet 1 in FIG. 6A. Up to six transmissions T1 through T6 may be sent for packet 1, one transmission at a time, starting with transmission T1. Two transmissions T1 and T2 are sent in frames $F_1$ and $F_2$, respectively. Three transmissions R0, R1 and R2 are received in frames $F_0$, $F_1$ and $F_2$, respectively. Buffer 1 stores the three received transmissions R0, R1 and R2 under an assumption that the SOP of packet 1 is at frame $F_0$, which is incorrect, and thus R0, R1 and R2 are stored in the wrong locations in buffer 1. Buffer 2 stores the two received transmissions R1 and R2 under an assumption that the SOP of packet 1 is at frame $F_1$, which is correct, and thus R1 and R2 are stored in the proper locations in buffer 2. Buffer 3 stores the received transmission R2 under an assumption that the SOP of packet 1 is at frame $F_2$, which is also incorrect, and thus is stored in the wrong location in buffer 3. The information in buffer 2 may be decoded correctly whereas the information in buffers 1 and 3 may be decoded in error.

In general, the received transmissions may be stored directly in the buffers or may be processed prior to storage. For example, LLRs may be computed and stored in the buffers. Information for different transmissions may be stored in different locations of a buffer (e.g., as shown in FIG. 7) and/or may be combined with other information in the buffer (not shown in FIG. 7).

Figure 6B:
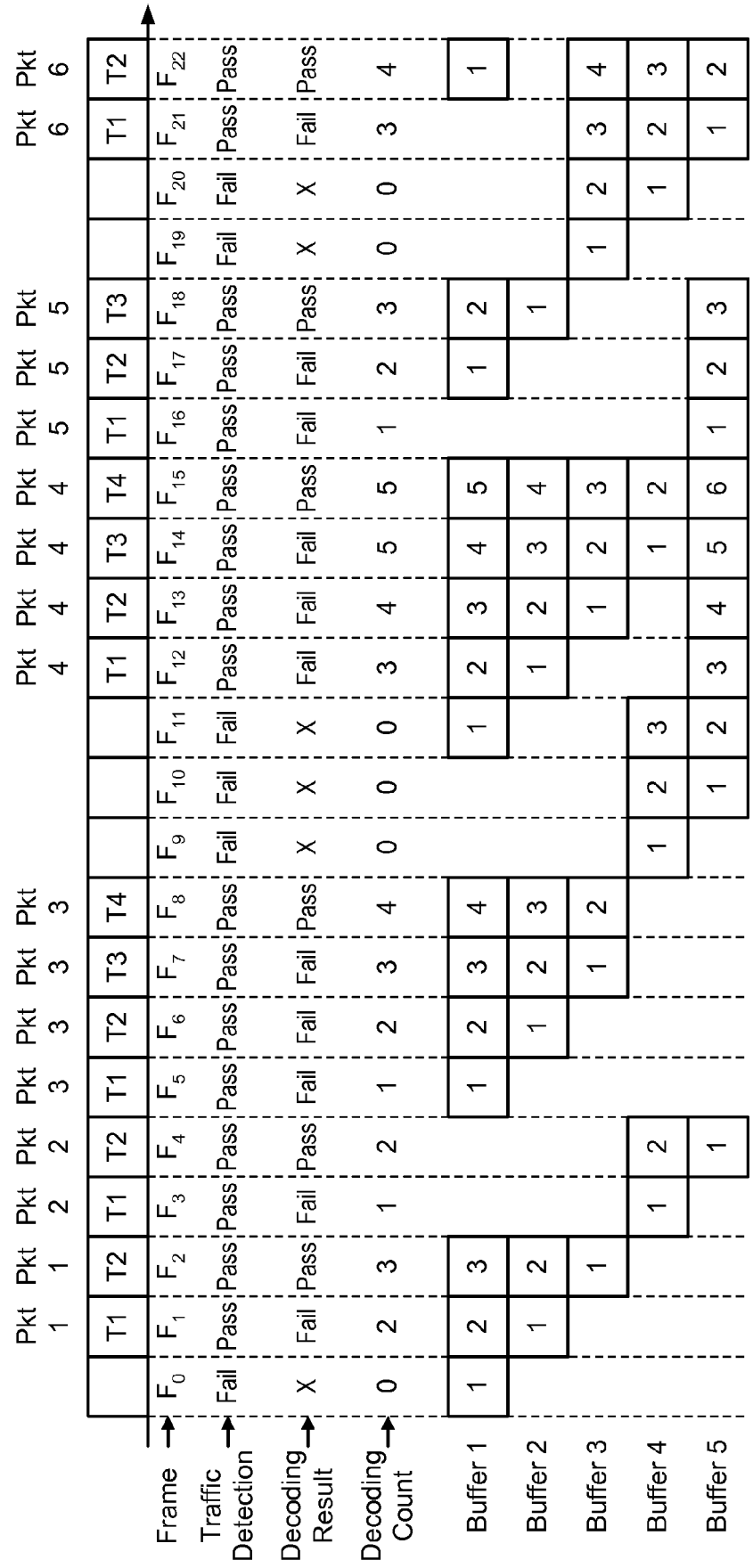

FIG. 6B shows an example of packet decoding for H-ARQ with five rotating buffers for a 5-frame sliding SOP window. In this example, buffers 1 through 5 are assigned in a sequential and circular manner to new SOP hypotheses. The sequence of transmissions in FIG. 6B is the same as in FIG. 2.

For packet 1, the first SOP hypothesis of $F_0$ is assigned to buffer 1, the second SOP hypothesis of $F_1$ is assigned to buffer 2, and the third SOP hypothesis of $F_2$ is assigned to buffer 3. For packet 2, the first SOP hypothesis of $F_3$ is assigned to buffer 4, and the second SOP hypothesis of $F_4$ is assigned to buffer 5. For packet 3, the first SOP hypothesis of $F_5$ is assigned to buffer 1 (which is the oldest previously assigned buffer at frame $F_5$), the second SOP hypothesis of $F_6$ is assigned to buffer 2, and the third SOP hypothesis of $F_7$ is assigned to buffer 3. For packet 4, the first SOP hypothesis of $F_9$ is assigned to buffer 4 (which is the oldest previously assigned buffer at frame $F_9$), the second SOP hypothesis of $F_{10}$ is assigned to buffer 5, the third SOP hypothesis of $F_{11}$ is assigned to buffer 1, the fourth SOP hypothesis of $F_{12}$ is assigned to buffer 2, the fifth SOP hypothesis of $F_{13}$ is assigned to buffer 3, and the sixth SOP hypothesis of $F_{14}$ is assigned to buffer 4. Buffers may be assigned to the SOP hypotheses for packets 5 and 6 in similar manner.

FIGS. 4 through 6B show some example SOP window sizes. In general, the SOP window size may be selected based on various factors such as the reliability of the traffic detection (e.g., smaller SOP window for more reliable traffic detection), the maximum number of transmissions for a packet, decoding complexity, etc.

FIG. 8 shows a process 800 for decoding packets sent with H-ARQ. A plurality of transmissions may be received in a plurality of frames for a packet, e.g., one transmission in each frame (block 812). The plurality of received transmissions may include zero, one, or multiple transmissions without packet data (or traffic) and at least one transmission with packet data. Whether each received transmission carry packet data or no packet data may be detected (block 814).

A sliding window indicative of at least one SOP hypothesis for the packet may be determined, e.g., based on detection results for the plurality of received transmissions (block 816). For example, the sliding window may be initialized at an earliest received transmission among the plurality of received transmissions, moved forward for each subsequent received transmission with no detected packet data, and maintained at the first received transmission with detected packet data. Each SOP hypothesis may correspond to a different frame (or received transmission) hypothesized to be the SOP of the packet. The sliding window may include (a) up to N SOP hypotheses for the packet, (b) up to L SOP hypotheses for up to L received transmissions with no detected packet data prior to the first received transmission with detected packet data, and (c) up to R SOP hypotheses for up to R received transmissions after the first received transmission with detected packet data, where N, L and R may be any suitable integer values. For example, N may be equal to three, and L and R may each be equal to one.

The plurality of received transmissions may be decoded based on the at least one SOP hypothesis for the packet (block 818). Transmissions received prior to the first received transmission with detected packet data may be stored. Decoding may be started when the first received transmission with packet data is detected. In each frame after decoding is started, one or more SOP hypotheses applicable for that frame may be determined, and decoding may be performed for one SOP hypothesis at a time. The one or more SOP hypotheses applicable for each frame have the hypothesized SOP of the packet being at that frame or earlier. The decoding for each SOP hypothesis may be based on all transmissions received for that SOP hypothesis in that frame or earlier.

FIG. 9 shows an apparatus 900 for decoding packets sent with H-ARQ. Apparatus 900 includes means for receiving a plurality of transmissions in a plurality of frames for a packet, e.g., one transmission in each frame (module 912), means for detecting whether each received transmission carry packet data or no packet data (module 914), means for determining a sliding window indicative of at least one SOP hypothesis for the packet, e.g., based on detection results for the plurality of received transmissions (module 916), and means for decoding the plurality of received transmissions based on the at least one SOP hypothesis for the packet (module 918). Modules 912 to 918 may comprise processors, electronics devices, hardware devices, electronics components, logical circuits, memories, etc., or any combination thereof.

FIG. 10 shows a process 1000 for using rotating buffers to decode packets sent with H-ARQ. At least one SOP hypothesis may be determined for a packet (block 1012). At least one buffer among a plurality of buffers may be assigned to the at least one SOP hypothesis for the packet, one buffer for each SOP hypothesis (block 1014). The plurality of buffers may be selected for assignment to SOP hypotheses in a predetermined order, e.g., in a sequential and circular manner. The number of buffers may be equal to the maximum number of possible SOP hypotheses for the packet. At least one received transmission for each SOP hypothesis may be stored in the buffer assigned to that SOP hypothesis (block 1016). For example, each buffer may store LLRs for the at least one received transmission for its SOP hypothesis. A SOP hypothesis for a second packet may be determined (block 1018). A next buffer may then be assigned to the SOP hypothesis for the second packet (block 1018). The next buffer may be the buffer after the at least one buffer assigned to the prior packet and among the plurality of buffers FIG. 11 shows an apparatus 1100 for using rotating buffers to decode packets sent with H-ARQ. Apparatus 1100 includes means for determining at least one SOP hypothesis for a packet (module 1112), means for assigning at least one buffer among a plurality of buffers to the at least one SOP hypothesis for the packet, one buffer for each SOP hypothesis (module 1114), means for storing at least one received transmission for each SOP hypothesis in a buffer assigned to the SOP hypothesis (module 1116), means for determining a SOP hypothesis for a second packet (module 1118), and means for assigning a next buffer to the SOP hypothesis for the second packet, with the next buffer being after the at least one buffer and among the plurality of buffers (module 1120). Modules 1112 to 1120 may comprise processors, electronics devices, hardware devices, electronics components, logical circuits, memories, etc., or any combination thereof.

Figure 12:
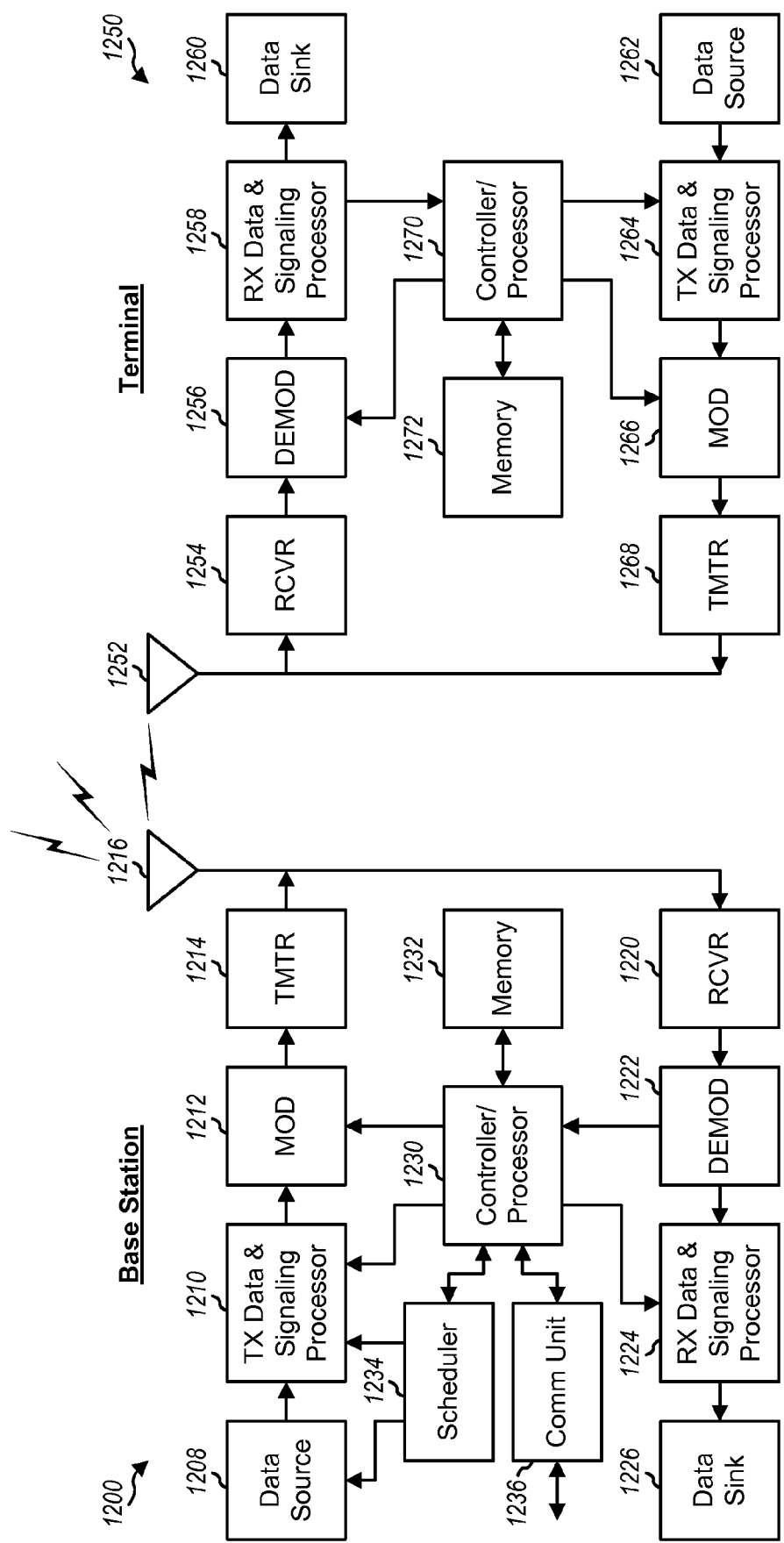
FIG. 12 shows a block diagram of a base station and a terminal.

FIG. 12 shows a block diagram of a design of a base station 1200 and a terminal 1250. In this design, base station 1200 and terminal 1250 are each equipped with a single antenna. For forward link transmission, at base station 1200, a transmit (TX) data and signaling processor 1210 receives packets of data for one or more terminals from a data source 1208, processes (e.g., formats, encodes, interleaves, and symbol maps) each packet, and provides a set of data symbols for each packet. Processor 1210 may provide a different subset of data symbols for each transmission of a given packet sent with H-ARQ. Processor 1210 also receives signaling (e.g., ACKs/NAKs for H-ARQ transmissions received on the reverse link) and generates signaling symbols. A modulator (MOD) 1212 performs modulation (e.g., for OFDM, SC-FDM, CDMA, etc.) on the data symbols, signaling symbols, and pilot symbols and provides output chips. A transmitter (TMTR) 1214 conditions (e.g., converts to analog, filters, amplifies, and upconverts) the output chips and generates a forward link signal, which is transmitted via an antenna 1216.

At terminal 1250, an antenna 1252 receives forward link signals from base station 1200 and possibly other base stations. A receiver (RCVR) 1254 processes (e.g., amplifies, downconverts, filters, and digitizes) the received signal from antenna 1252 and provides received samples. A demodulator (DEMOD) 1256 performs demodulation (e.g., for OFDM, SC-FDM, CDMA, etc.) on the received samples and provides received symbols. A receive (RX) data and signaling processor 1258 processes (e.g., symbol demaps, deinterleaves, and decodes) the received symbols and provides decoded data for terminal 1250 to a data sink 1260 and recovered signaling to a controller/processor 1270. Processor 1260 may perform decoding for one or more SOP hypothesis for each packet sent on the forward link to terminal 1250.

For reverse link transmission, at terminal 1250, a TX data and signaling processor 1264 receives packets of data from a data source 1262 and generates a set of data symbols for each packet. Processor 1210 may provide a different subset of data symbols for each transmission of a given packet sent with H-ARQ. Processor 1264 also generates signaling symbols for signaling to be sent to base station 1200, e.g., ACKs/NAKs for H-ARQ transmissions received on the forward link. A modulator 1266 performs modulation on the data symbols, signaling symbols, and pilot symbols and provides output chips. A transmitter 1268 conditions the output chips and generates a reverse link signal, which is transmitted via antenna 1252.

At base station 1200, reverse link signals from terminal 1250 and other terminals are received by antenna 1216, conditioned and digitized by a receiver 1220, demodulated by a demodulator 1222, and processed by an RX data and signaling processor 1224 to recover packet data and signaling sent by terminal 1250 and other terminals. Processor 1224 may perform decoding for one or more SOP hypothesis for each packet sent on the reverse link to base station 1200. Processors 1224 and 1258 may each implement process 800 in FIG. 8, process 1000 in FIG. 10, and/or other processes for the techniques described herein.

Controllers/processors 1230 and 1270 direct the operation at base station 1200 and terminal 1250, respectively. Processors 1230 and 1270 may each implement process 1000 in FIG. 10 and/or other processes for the techniques described herein. Memories 1232 and 1272 store program codes and data for base station 1200 and terminal 1250, respectively. A communication (Comm) unit 1236 allows base station 1200 to communicate with other network entities via a backhaul. A scheduler 1234 schedules the terminals being served by base station 1200 for transmission on the forward and reverse links.

Figure 13:
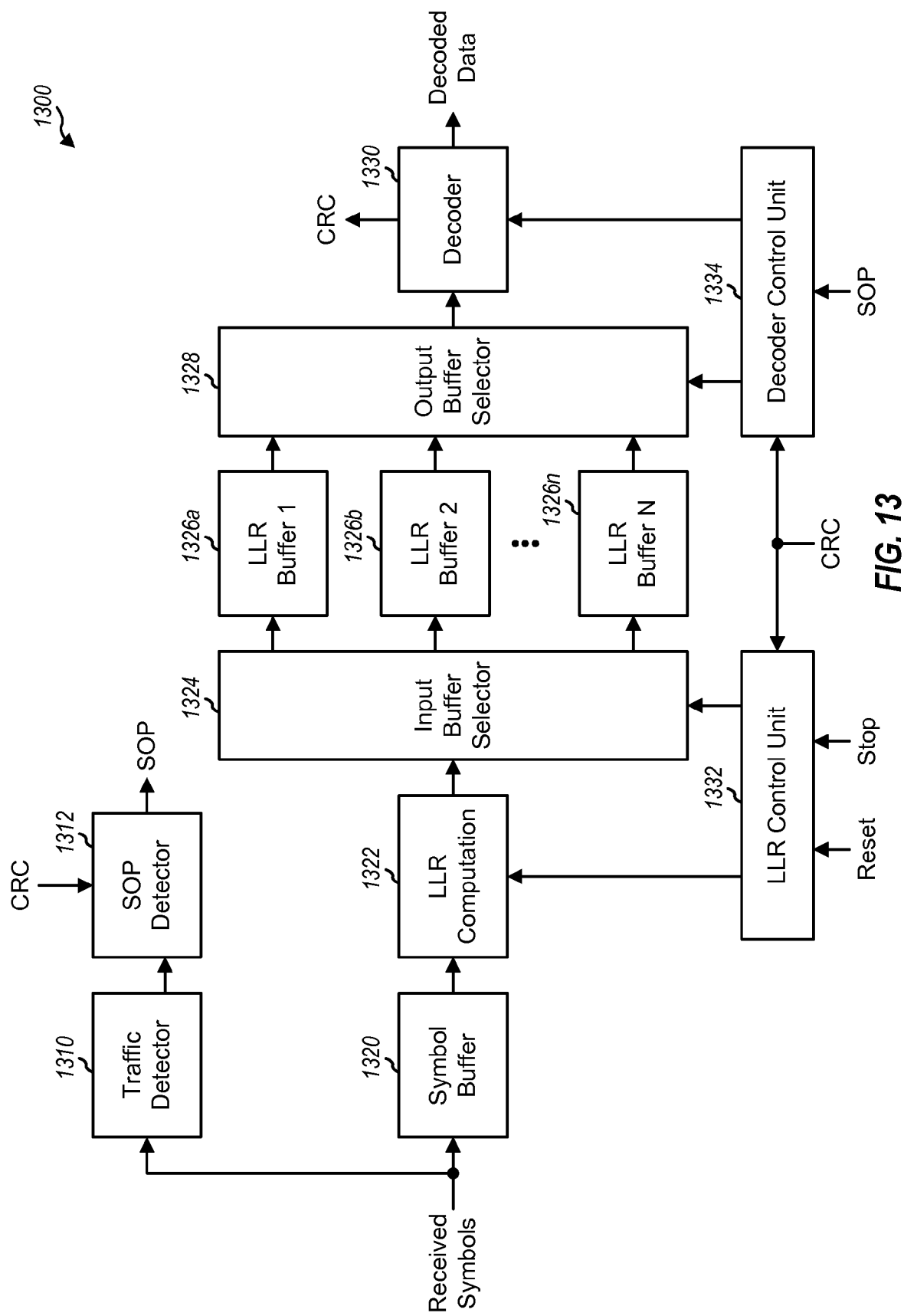
FIG. 13 shows a block diagram of a receive (RX) data processor.

FIG. 13 shows a block diagram of a design of an RX data processor 1300, which may be part of processor 1224 and/or processor 1258 in FIG. 12. Within processor 1300, the received symbols in each frame are provided to a traffic detector 1310 and a symbol buffer 1320. Traffic detector 1310 performs traffic detection in each frame based on the received symbols for that frame and provides a "pass" or "fail" indication. A SOP detector 1312 receives the pass/fail indications from traffic detector 1310 and decoding results from a decoder 1330 and provides a SOP decision for each packet. The decoding result for a decoding attempt may be given by a cyclic redundancy check (CRC) pass if a packet is decoded correctly or a CRC failure if the packet is decoded in error.

Symbol buffer 1320 stores the received symbols and provides these received symbols at appropriate time. An LLR computation unit 1322 computes LLRs for code bits in the received transmission in each frame based on the received symbols and a modulation scheme used for that frame. Unit 1322 may be controlled by a control signal from an LLR control unit 1332. An input buffer selector 1324 receives the LLRs from unit 1322 and provides these LLRs to one of N buffers 1326a through 1326n based on a select signal from LLR control unit 1332. Each buffer 1326 stores LLRs for one SOP hypothesis for one packet at any given moment. Each buffer 1326 may store and/or combine LLRs whenever a new transmission is received for the current packet. An output buffer selector 1328 receives the LLRs from one of N buffers 1326a through 1326n for each decoding attempt and provides these LLRs to decoder 1330. A decoder control unit 1334 provides a select signal that selects one of the N buffers 1326 for each decoding attempt. Decoder 1330 decodes the LLRs from selector 1328 for each decoding attempt and provides the decoding status (e.g., CRC pass or fail) for that decoding attempt as well as a decoded packet if the decoding is successful.

LLR control unit 1332 receives Reset and Stop commands (e.g., from controller 1230 or 1270) and the decoding results (e.g., CRC) from decoder 1330 and generates the control signal for unit 1322 and the select signal for selector 1324. Decoder control unit 1334 receives the SOP decisions (SOP) from SOP detector 1312 and the decoding results (CRC) from decoder 1330 and generates the select signal for selector 1328 and the control signal for decoder 1330.

Figure 14:
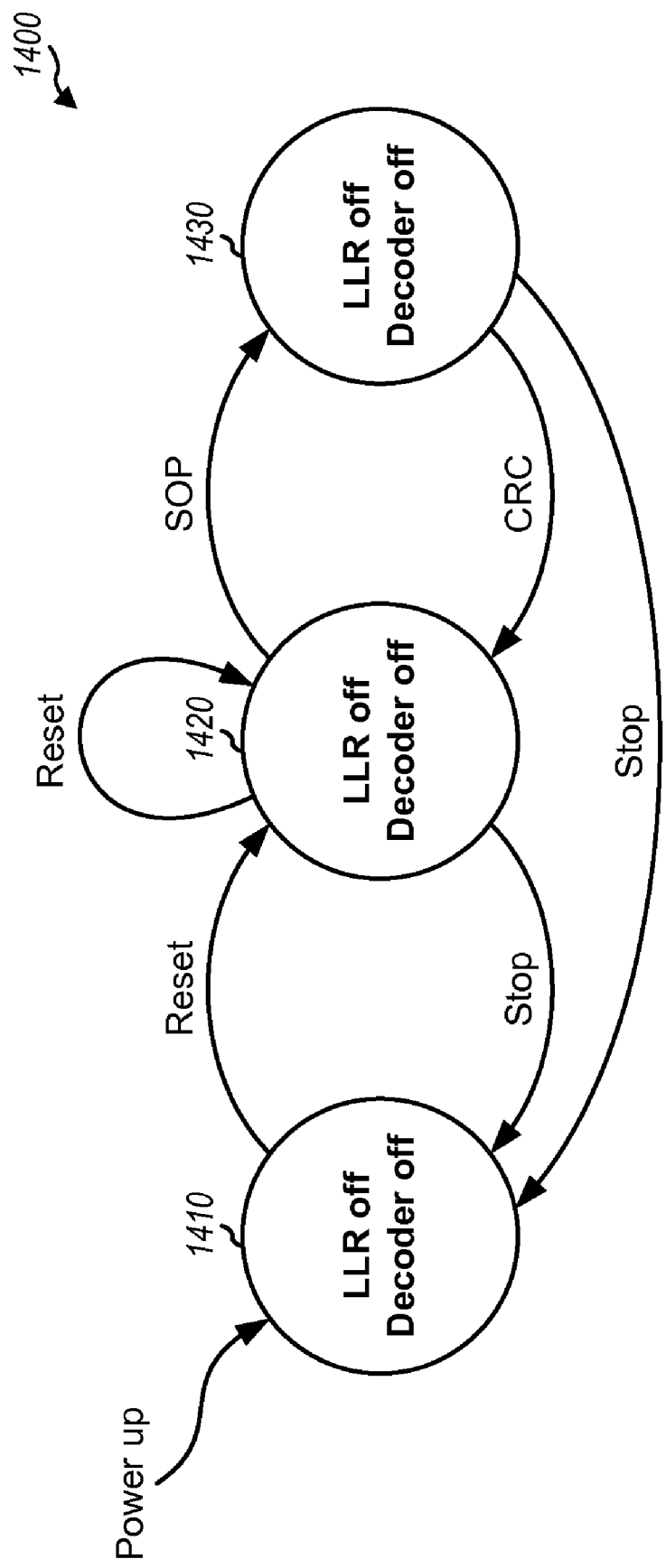
FIG. 14 shows a state diagram for LLR computation and decoding.

FIG. 14 shows a state diagram 1400 that may be used for LLR computation unit 1322 and decoder 1330 in FIG. 13. In an LLR off and decoder off state 1410, LLR computation and decoding are not performed. In an LLR on and decoder off state 1420, LLR computation is performed on received symbols, and decoding is not performed. In an LLR on and decoding on state 1430, LLR computation is performed on received symbols, and decoding is performed on LLRs. State 1410 may be entered at power up and also upon receiving a Stop command while in either state 1420 or 1430. State 1420 may be entered upon receiving a Reset command while in state 1410 and also upon receiving a CRC pass for a packet while in state 1430. State 1430 may be entered upon making a SOP decision for a packet.

Table 1 lists some example operations that may be performed in response to each of the commands shown in FIG. 14.

TABLE 1

| Command | Operations |
| --- | --- |
| Reset | Clear current SOP hypotheses, Configure sliding SOP window size and alignment, Start forming new SOP hypotheses within SOP window in next frame, and Allow SOP window to slide with incoming frame. |
| Stop | Clear current SOP hypotheses, and Do not form any new SOP hypothesis. |

TABLE 1-continued

| Command | Operations |
| --- | --- |
| SOP | Maintain SOP window at current frame, Continue forming SOP hypotheses within SOP window, and Start decoding for SOP hypotheses within SOP window. |
| CRC | Stop decoding for the current packet, Clear current SOP hypotheses, Start forming new SOP hypotheses within SOP window in next frame, and Allow SOP window to slide with incoming frame. |

FIG. 6A shows an example of when the commands in Table 1 may be generated for an example sequence of transmissions. The Reset command may be issued prior to the first received transmission and may be used to initialize the sliding SOP window. The SOP command may be issued whenever a SOP decision is made for a packet, e.g., based on the traffic detection for the current frame and the decoding results for the prior frame. The CRC command may be issued whenever a packet is decoded correctly. The Stop command may be issued when data transmission is terminated or paused.

The traffic detection and packet decoding for H-ARQ may be performed by multiple layers such as a Medium Access Control (MAC) layer and a physical (PHY) layer. The MAC layer may maintain state diagram 1400, generate Reset, Stop, SOP, and CRC commands, and issue these commands to the PHY layer. The PHY layer may perform LLR computation and packet decoding based on the commands received from the MAC layer. The PHY layer may also keep track of the N buffers, assign buffers to new SOP hypotheses, select SOP hypothesis for decoding, etc. The set of commands in Table 1 may provide a simple interface between the MAC and PHY layers, which may simplify the design and/or the operation of these layers, allow for flexible MAC design, and allow the MAC to control PHY operation with few commands. Other commands may also be used to support LLR computation and packet decoding for H-ARQ with sliding SOP window and/or rotating buffers.

The techniques described herein may provide various advantages. The techniques may be able to efficiently handle multiple SOP hypotheses as well as delayed and time changing SOP hypotheses. The sliding SOP window may be able to handle delayed SOP hypotheses. The rotating buffers may be able to handle multiple SOP hypotheses. The simple interface may be able to handle changing SOP hypotheses. The techniques may reduce complexity while supporting flexible MAC logic for reliable H-ARQ packet decoding. The techniques may also be able to streamline SOP hypotheses processing to reduce data buffering and decoding.

The techniques described herein may be implemented by various means. For example, these techniques may be implemented in hardware, firmware, software, or a combination thereof. For a hardware implementation, the processing units used to implement the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, etc.) that perform the functions described herein. The firmware and/or software codes may be stored in a memory (e.g., memory 1232 or 1272 in FIG. 12) and executed by a processor (e.g., processor 1230 or 1270). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus for H-ARQ transmission comprising:
   at least one processor configured to:
   receive a plurality of transmissions for a packet;
   determine a sliding window indicative of at least one start of packet (SOP) hypothesis for the packet, wherein the SOP hypothesis is determined for the packet based on an SOP decision and each SOP hypothesis may correspond to a different frame hypothesized to be the SOP of the packet and wherein the sliding window keeps track of SOP hypotheses for the packet; and
   decode the plurality of received transmissions based on the at least one SOP hypothesis for the packet;
   a memory coupled to the at least one processor; and
   wherein the at least one processor is configured to initialize said sliding window at an earliest received transmission among the plurality of received transmissions to move the sliding window forward for each subsequent received transmission until a SOP decision is made, and to maintain the sliding window at a received transmission where the SOP decision is made.

2. The apparatus of claim 1, wherein the plurality of received transmissions comprise at least one transmission without packet data and at least one transmission with packet data.

3. The apparatus of claim 1, wherein the at least one processor is configured to detect whether each of the plurality of received transmissions carry packet data or no packet data, and to determine the sliding window based on detection results for the plurality of received transmissions.

4. The apparatus of claim 1, wherein the at least one processor is configured to determine a first received transmission with packet data among the plurality of received transmissions, and to center the sliding window at the first received transmission with packet data.

5. The apparatus of claim 1, wherein the at least one processor is configured to center the sliding window at a designated received transmission among the plurality of received transmissions.

6. The apparatus of claim 1, wherein the plurality of transmissions are received in a plurality of frames, one transmission in each frame, and wherein each SOP hypothesis corresponds to a different frame hypothesized to be the SOP of the packet.

7. The apparatus of claim 6, wherein for each frame in the plurality of frames the at least one processor is configured to determine one or more SOP hypotheses applicable for the frame and to perform decoding for one SOP hypothesis at a time among the one or more SOP hypotheses.

8. The apparatus of claim 6, wherein for each frame in the plurality of frames the at least one processor is configured to determine one or more SOP hypotheses applicable for the frame and to perform decoding for each SOP hypothesis based on transmissions received for the SOP hypothesis in the frame or earlier.

9. The apparatus of claim 1, wherein the memory is configured to store transmissions received prior to a first received transmission with detected packet data, and wherein the at least one processor is configured to start decoding when the first received transmission with packet data is detected.

10. The apparatus of claim 1, wherein the sliding window includes up to L SOP hypotheses for up to L received transmissions with no detected packet data prior to a first received transmission with detected packet data, where L is an integer value.

11. The apparatus of claim 1, wherein the sliding window includes no SOP hypotheses prior to a first received transmission with detected packet data if a transmission received immediately prior to the first received transmission with detected packet data is for another packet that is correctly decoded.

12. The apparatus of claim 1, wherein the sliding window includes up to R SOP hypotheses for up to R received transmissions after a first received transmission with detected packet data, where R is an integer value.

13. The apparatus of claim 1, wherein the sliding window includes up to three SOP hypotheses for the packet and up to one SOP hypothesis for up to one received transmission with no detected packet data prior to a first received transmission with detected packet data.

14. The apparatus of claim 1, wherein the at least one processor is configured to generate a reset command to clear prior SOP hypotheses, to start forming new SOP hypotheses for the packet, to allow the sliding window to move forward with each received transmission, or a combination thereof.

15. The apparatus of claim 1, wherein the at least one processor is configured to generate a stop command to clear current SOP hypotheses, to stop forming new SOP hypotheses, or both.

16. The apparatus of claim 1, wherein the at least one processor is configured to generate a SOP command to maintain the sliding window at current location, to continue forming SOP hypotheses within the sliding window for the packet, to start decoding for SOP hypotheses within the sliding window, or a combination thereof.

17. The apparatus of claim 1, wherein after successful decoding of the packet the at least one processor is configured to generate a command to stop decoding for the at least one SOP hypothesis for the packet, to clear the at least one SOP hypothesis, to start forming new SOP hypotheses for a next packet, to allow the sliding window to slide with each subsequent received transmission, or a combination thereof.

18. A method of packet decoding for H-ARQ transmissions comprising:
   receiving a plurality of transmissions for a packet;
   determining a sliding window indicative of at least one start of packet (SOP) hypothesis for the packet, wherein the SOP hypothesis is determined for the packet based on an SOP decision and each SOP hypothesis may correspond to a different frame hypothesized to be the SOP of the packet and wherein the sliding window keeps track of SOP hypotheses for the packet;
   decoding the plurality of received transmissions based on the at least one SOP hypothesis for the packet; and
   wherein determining the sliding window comprises:
   initializing the sliding window at an earliest received transmission among the plurality of received transmissions,
   moving the sliding window forward for each subsequent received transmission with no detected packet data, and maintaining the sliding window at a first received transmission with detected packet data.

19. The method of claim 18, wherein the plurality of transmissions are received in a plurality of frames, and wherein the decoding comprises, for each frame in the plurality of frames,
determining one or more SOP hypotheses applicable for the frame, and
performing decoding for one SOP hypothesis at a time among the one or more SOP hypotheses.

20. The method of claim 18, further comprising:
storing transmissions received prior to a first received transmission with detected packet data; and
starting decoding when the first received transmission with packet data is detected.

21. The method of claim 18, further comprising:
assigning at least one of a plurality of buffers to the at least one SOP hypothesis for the packet, one buffer for each SOP hypothesis; and
storing at least one received transmission for each SOP hypothesis in a buffer assigned to the SOP hypothesis.

22. The method of claim 21, further comprising:
selecting the plurality of buffers for assignment to SOP hypotheses in a predetermined order.

23. An apparatus comprising:
means for receiving a plurality of transmissions for a packet;
means for determining a sliding window indicative of at least one start of packet (SOP) hypothesis for the packet, wherein the SOP hypothesis is determined for the packet based on an SOP decision and each SOP hypothesis may correspond to a different frame hypothesized to be the SOP of the packet and wherein the sliding window keeps track of SOP hypotheses for the packet;
means for decoding the plurality of received transmissions based on the at least one SOP hypothesis for the packet; and
means for initializing the sliding window at an earliest received transmission among the plurality of received transmissions,
means for moving the sliding window forward for each subsequent received transmission with no detected packet data, and
means for maintaining the sliding window at a first received transmission with detected packet data.

24. The apparatus of claim 23, wherein the plurality of transmissions are received in a plurality of frames, and wherein the means for decoding comprises, for each frame in the plurality of frames,
means for determining one or more SOP hypotheses applicable for the frame, and
means for performing decoding for one SOP hypothesis at a time among the one or more SOP hypotheses.

25. The apparatus of claim 23, further comprising:
means for storing transmissions received prior to a first received transmission with detected packet data; and
means for starting decoding when the first received transmission with packet data is detected.

26. The apparatus of claim 23 further comprising:
means for assigning at least one of a plurality of buffers to the at least one SOP hypothesis for the packet, one buffer for each SOP hypothesis; and
means for storing at least one received transmission for each SOP hypothesis in a buffer assigned to the SOP hypothesis.

27. A non-transitory processor-readable medium including instructions stored thereon, comprising:

a first instruction set for receiving a plurality of transmissions for a packet;
a second instruction set for determining a sliding window indicative of at least one start of packet (SOP) hypothesis for the packet, wherein the SOP hypothesis is determined for the packet based on an SOP decision and each SOP hypothesis may correspond to a different frame hypothesized to be the SOP of the packet and wherein the sliding window keeps track of SOP hypotheses for the packet;
a third instruction set for decoding the plurality of received transmissions based on the at least one SOP hypothesis for the packet;
wherein the second instruction set for determining the sliding window comprises:
a fourth instruction set for initializing the sliding window at an earliest received transmission among the plurality of received transmissions,
a fifth instruction set for moving the sliding window forward for each subsequent received transmission with no detected packet data, and
a sixth instruction set for maintaining the sliding window at a first received transmission with detected packet data.

28. An apparatus comprising:
at least one processor configured to receive a plurality of transmissions in a plurality of frames for a packet; determine a sliding window indicative of at least one start of packet (SOP) hypothesis for the packet, wherein the SOP hypothesis is determined for the packet based on an SOP decision and each SOP hypothesis may correspond to a different frame hypothesized to be the SOP of the packet and wherein the sliding window keeps track of SOP hypotheses for the packet,
to make a start of packet (SOP) decision for the packet, the SOP decision indicating one of the plurality of frames as a SOP of the packet, to determine at least one SOP hypothesis for the packet based on the SOP decision, and to decode the plurality of received transmissions based on the at least one SOP hypothesis for the packet;
a memory coupled to the at least one processor; and
wherein the at least one processor is configured to initialize said sliding window at an earliest received transmission among the received transmissions to move the sliding window forward for each subsequent received transmission until a SOP decision is made, and to maintain the sliding window at a received transmission where the SOP decision is made.

29. The apparatus of claim 28, wherein the at least one processor is configured to detect whether each of the plurality of received transmissions carry packet data or no packet data, to identify a first received transmission with detected packet data among the plurality of received transmissions, and to provide a frame with the first received transmission with detected packet data as the SOP decision.

30. The apparatus of claim 28, wherein the at least one SOP hypothesis comprises one SOP hypothesis for the SOP decision, up to one SOP hypothesis for up to one frame prior to the SOP decision, and up to one SOP hypothesis for up to one frame after the SOP decision.

31. The apparatus of claim 28, further comprising:
a plurality of buffers; and
at least one processor coupled to the plurality of buffers and configured to determine at least one start of packet (SOP) hypothesis for a packet, to assign at least one of the plurality of buffers to the at least one SOP hypothesis for the packet, one buffer for each SOP hypothesis, each buffer storing at least received transmission for the SOP hypothesis to which the buffer is assigned, wherein the SOP hypothesis is determined for the packet based on an SOP decision and each SOP hypothesis may correspond to a different frame hypothesized to be the SOP of the packet. one 32. The apparatus of claim 31, wherein the at least one processor is configured to select the plurality of buffers for assignment to SOP hypotheses in a predetermined order.

33. The apparatus of claim 31, wherein the at least one processor is configured to determine a SOP hypothesis for a second packet, and to assign a next buffer to the SOP hypothesis for the second packet, the next buffer being after the at least one buffer among the plurality of buffers.

34. The apparatus of claim 31, wherein the number of buffers is equal to a maximum number of possible SOP hypotheses for the packet.

35. The apparatus of claim 31, wherein each buffer is configured to store log-likelihood ratios (LLRs) for the at least one received transmission for the SOP hypothesis to which the buffer is assigned.

* * * * *